United States Patent
Zuev et al.

(10) Patent No.: US 8,233,714 B2
(45) Date of Patent: Jul. 31, 2012

(54) METHOD AND SYSTEM FOR CREATING FLEXIBLE STRUCTURE DESCRIPTIONS

(75) Inventors: Konstantin Zuev, Moscow (RU); Diar Tuganbaev, Moscow (RU); Irina Filimonova, Moscow (RU); Sergey Zlobin, Reutov (RU)

(73) Assignee: ABBYY Software Ltd., Nicosia (CY)

( * ) Notice: Subject to any disclaimer, the term of this patent is extended or adjusted under 35 U.S.C. 154(b) by 810 days.

(21) Appl. No.: 12/364,266

(22) Filed: Feb. 2, 2009

(65) Prior Publication Data

US 2009/0175532 A1 Jul. 9, 2009

Related U.S. Application Data

(63) Continuation-in-part of application No. 11/461,449, filed on Aug. 1, 2006.

(51) Int. Cl.
*G06K 9/34* (2006.01)

(52) U.S. Cl. .. 382/181; 382/180; 382/305; 707/999.003

(58) Field of Classification Search .................. 382/181, 382/180, 305; 707/999.1, 999, 999.004, 707/999.102, 999.003, 999.001, 999.202, 707/999.006, 999.002, 999.104, 999.005, 707/999.009, E7.127, E7.061, E7.101, E17.059, 707/709, 769, 736, 758; 375/E7.133, E7.15, 375/E7.163; 348/E7.013, E7.016; 709/206; 715/207, 234; 365/158, 171; 725/53, 135
See application file for complete search history.

(56) References Cited

U.S. PATENT DOCUMENTS

| | | | |
|---|---|---|---|
| 4,996,524 A * | 2/1991 | Tojima | 370/389 |
| 5,235,702 A * | 8/1993 | Miller | 1/1 |
| 5,317,646 A | 5/1994 | Sang et al. | |
| 5,434,962 A | 7/1995 | Kyojima et al. | |
| 5,497,319 A * | 3/1996 | Chong et al. | 704/2 |
| 5,822,454 A | 10/1998 | Rangarajan | |
| 5,963,949 A * | 10/1999 | Gupta et al. | 1/1 |
| 6,400,845 B1 | 6/2002 | Volino | |
| 7,149,347 B1 | 12/2006 | Wnek | |
| 7,149,367 B2 | 12/2006 | Ross | |
| 7,171,615 B2 | 1/2007 | Jensen et al. | |
| 7,227,478 B1 * | 6/2007 | Hendrix et al. | 341/61 |
| 7,251,658 B2 * | 7/2007 | Dane et al. | 1/1 |
| 7,310,635 B2 | 12/2007 | Tucker | |
| 7,346,215 B2 | 3/2008 | Shih et al. | |
| 7,529,408 B2 * | 5/2009 | Vohariwatt et al. | 382/180 |
| 7,606,741 B2 * | 10/2009 | King et al. | 705/27.2 |
| 7,739,258 B1 * | 6/2010 | Halevy et al. | 707/706 |
| 7,917,529 B2 * | 3/2011 | Lee et al. | 707/769 |
| 2006/0104511 A1 | 5/2006 | Guo et al. | |
| 2007/0168382 A1 | 7/2007 | Tillberg et al. | |
| 2008/0195968 A1 | 8/2008 | Schacht | |
| 2009/0028437 A1 | 1/2009 | Hirohata | |
| 2010/0060947 A1 * | 3/2010 | Tuganbaev et al. | 358/474 |

OTHER PUBLICATIONS

U.S. Appl. No. 11/461,449, filed Aug. 1, 2006, Zuev, Konstantin.

* cited by examiner

*Primary Examiner* — Sheela Chawan
(74) *Attorney, Agent, or Firm* — John C. Meline; LeighAnn Weiland (57) ABSTRACT

A method related to data capture from forms involving optical character recognition comprises detecting data fields on a scanned image; generating a flexible document description based on the detected data fields, including creating a set of search elements for each data field, each search element having associated search criteria; and training the flexible document description using a search algorithm to detect the data fields on additional training images based on the set of search elements.

22 Claims, 8 Drawing Sheets

HALLOWEEN REGISTRATION FORM

YOUR PHOTO IN FANCY DRESS — 461

NOTE:
Please remember that this form should be completed by extraterrestrials only

NAME: MARTIAN THE FIRST

YOUR PLANET NAME: MARS (satellite Phobos)

YOUR SPACESHIP NUMBER: 123 45 QU 16

DATE YOU ARRIVED AT THE EARTH: 12 / 12 / 2099

464 — YOUR IDENTITY NUMBER ON THE PARTY IS:

463

462 — 1 2 3 4 5 6 7 8 9 9 9 9 2

465

Back to the past:

Everything started a very long time ago, that is, in the 5th century B.C., in the place where today lies Great Britain and northern France. At that time, the Celts lived according to many beliefs and one of them is the beginning of this well-known celebration.

The Celts celebrated New Year on November 1st with a festival that indicated the end of the "Sun Season" and the beginning of the "Dark and Cold Season". It was a festival that the Celts of northern Europe (and the British Isles) marked with bonfires, to help the sun through the winter. Our modern celebration of "Halloween" is a descendant of the ancient Celtic fire festival called Samhain or "Summer's End," and was celebrated with human sacrifice, augury (divination, foretelling events by signs or omens) and prayer; for at this season spirits walked and evil had power over souls of men. The word is pronounced "sow-in", with "sow" rhyming with cow. In a very old tale, Samhain was the Lord of Death and Prince of Darkness.

The first meaning of Halloween was to frighten and send away the souls of the dead. It was believed that all the souls of people who had died that year would only go to heaven the day before All Saints' Day.

"All Saints' Day" or "Hallows' Day" are synonyms, thus "Hallows' Eve" is the day before Hallows' Day. Halloween was brought to the United States of America by the Irish immigrants in 1840.

The word Halloween means holy or sacred. The colors of Halloween are black and orange to suggest ideas of death and harvest.

METHOD AND SYSTEM FOR CREATING FLEXIBLE STRUCTURE DESCRIPTIONS

This application is a continuation-in-part of U.S. patent application Ser. No. 11/461,449 filed Aug. 1, 2006.

FIELD

Embodiments of the present invention relate generally to data capture by means of optical character recognition of forms, and specifically to a method and system for creating a flexible structure description for a form.

BACKGROUND OF THE INVENTION

Data on paper documents may be extracted and entered into a computer system for storage, analysis, and further processing. Examples of said paper documents include invoices, receipts, questionnaires, tax return forms, etc. These paper documents may have varying structures. Advantageously, if the number of documents to be processed is large, automated data and document capture systems can be used.

A form is a structured document with one or more pages to be filled out by a human, either manually or using a printing device. Typically, a form has fields to be completed with an inscription next to each field stating the nature of the data the field should contain.

Figure 4A:
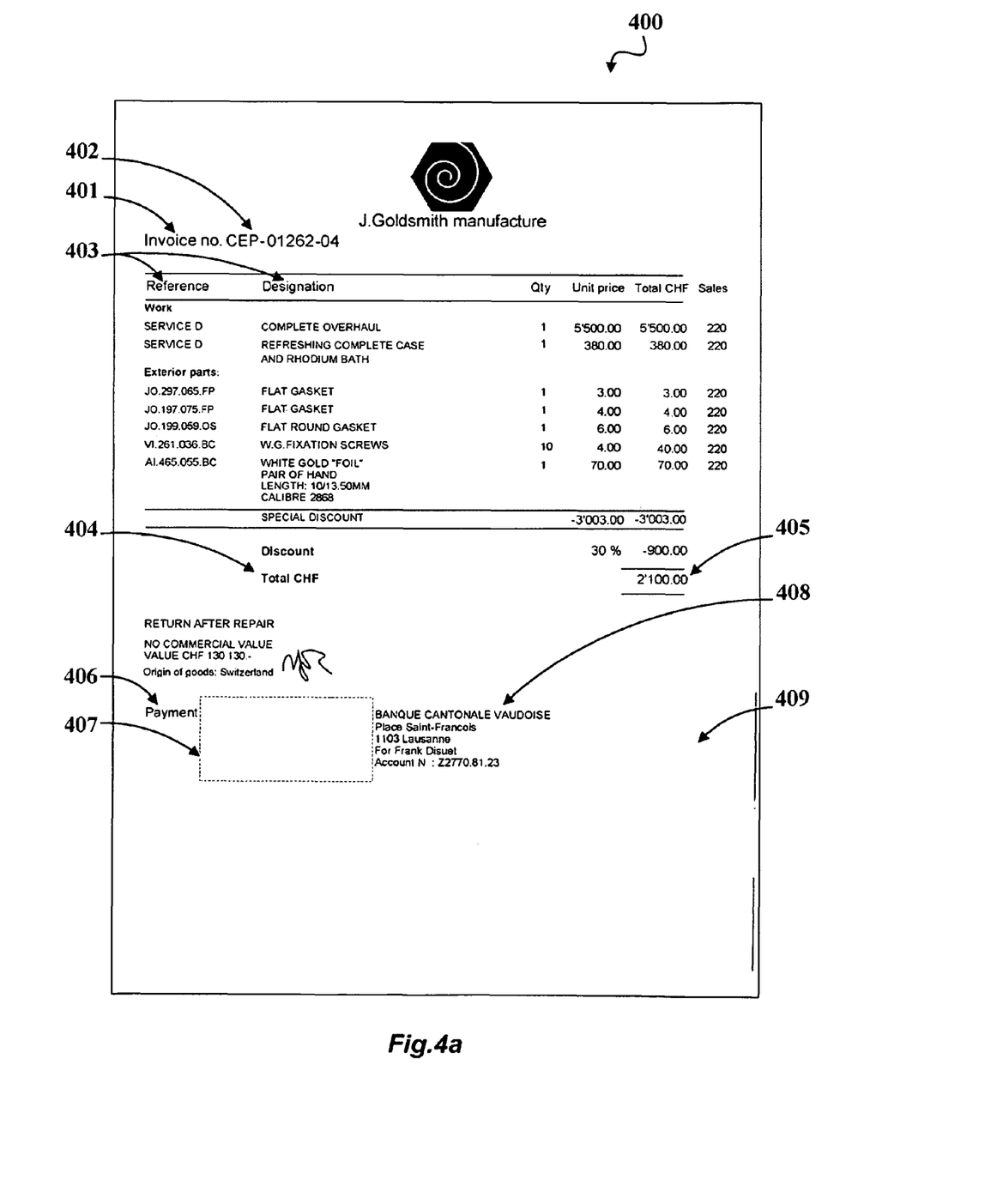
FIGS. 4a-4b shows schematic views of sample invoices.
Figure 4B:
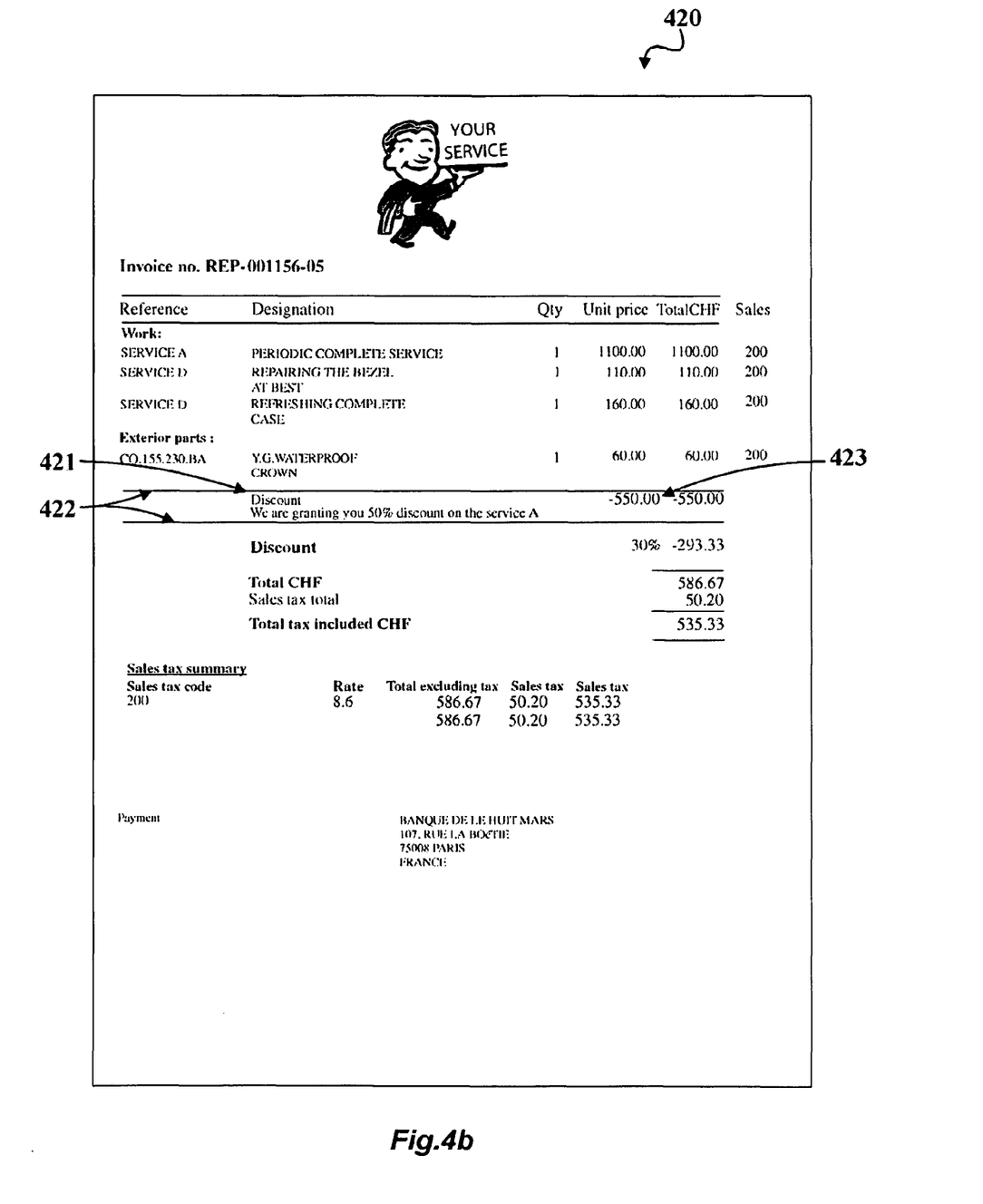

Two types of forms can be identified-fixed forms and flexible forms. A fixed form has the same positioning and number of fields on all of its copies (instances) and often has anchor elements (e.g. black squares or separator lines), whereas a flexible, or semi-structured form may have different number of fields which may be positioned differently from copy to copy. Examples of flexible forms include application forms, invoices, insurance forms, money order forms, business letters, etc. (FIGS. 4a-4d). For example, invoices will often have different numbers of fields located differently, as they are issued by different companies (FIGS. 4a and 4b). Further, common fields e.g. an invoice number (401) and total amount (404) may be found on all invoices, even though they may be placed differently.

Flexible forms may be converted into electronic format and made editable by means of a data capture system using Optical Character Recognition (OCR). For efficient data capture, the data capture system has to be trained in advance to detect the useful data fields on documents of the various types that the system will handle. As a result, the system can detect the required fields and extract data from them automatically. A highly skilled expert is required to train the system to detect the necessary data fields on documents of a given type. The training is done in a dedicated editing application and is very labor-intensive.

SUMMARY

In one embodiment, the invention provides a method, comprising detecting data fields on a scanned image; generating a flexible document description based on the detected data fields, including creating a set of search elements for each data field, each search element having associated search criteria; and training the flexible document description using a search algorithm to detect the data fields on additional training images based on the set of search elements.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an Embodiment" means that a particular feature, structure, or characteristic described in connection with the embodiment is included in at least one embodiment of the invention. The appearance of the phrases "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

A flexible structure description consists of fields, elements, and relationships among them. A field identifies an area on the image from which data are to be extracted and the type of data that this area may contain. The positions of the fields are usually detected based on reference elements, or anchors. An anchor corresponds to one or more predefined image elements (e.g. separator line, unchangeable text, picture, etc.) relative to which the positions of other elements are specified. For example, the text Invoice No. or Total CHF (FIG. 4a) can be used as an anchor relative to which the respective fields can be detected.

Embodiments of the present invention disclose a method for creating a flexible structure description for a semi-structured document automatically during data capture, without prior set-up of a field detection algorithm. Embodiments of the invention also disclose a data capture system capable of implementing the inventive method. In one embodiment, the data capture system may be implemented using the hardware platform described herein with reference to FIG. 5 of the drawings.

Advantageously, the method allows training and "extra Training" a flexible structure description to make it suitable for a new document type without enlisting the services of an expert, and makes the creation of a flexible structure description by an expert easier whenever a completely automated creation of a flexible structure description is impossible (for example, when processing images of very poor quality).

Figure 1:
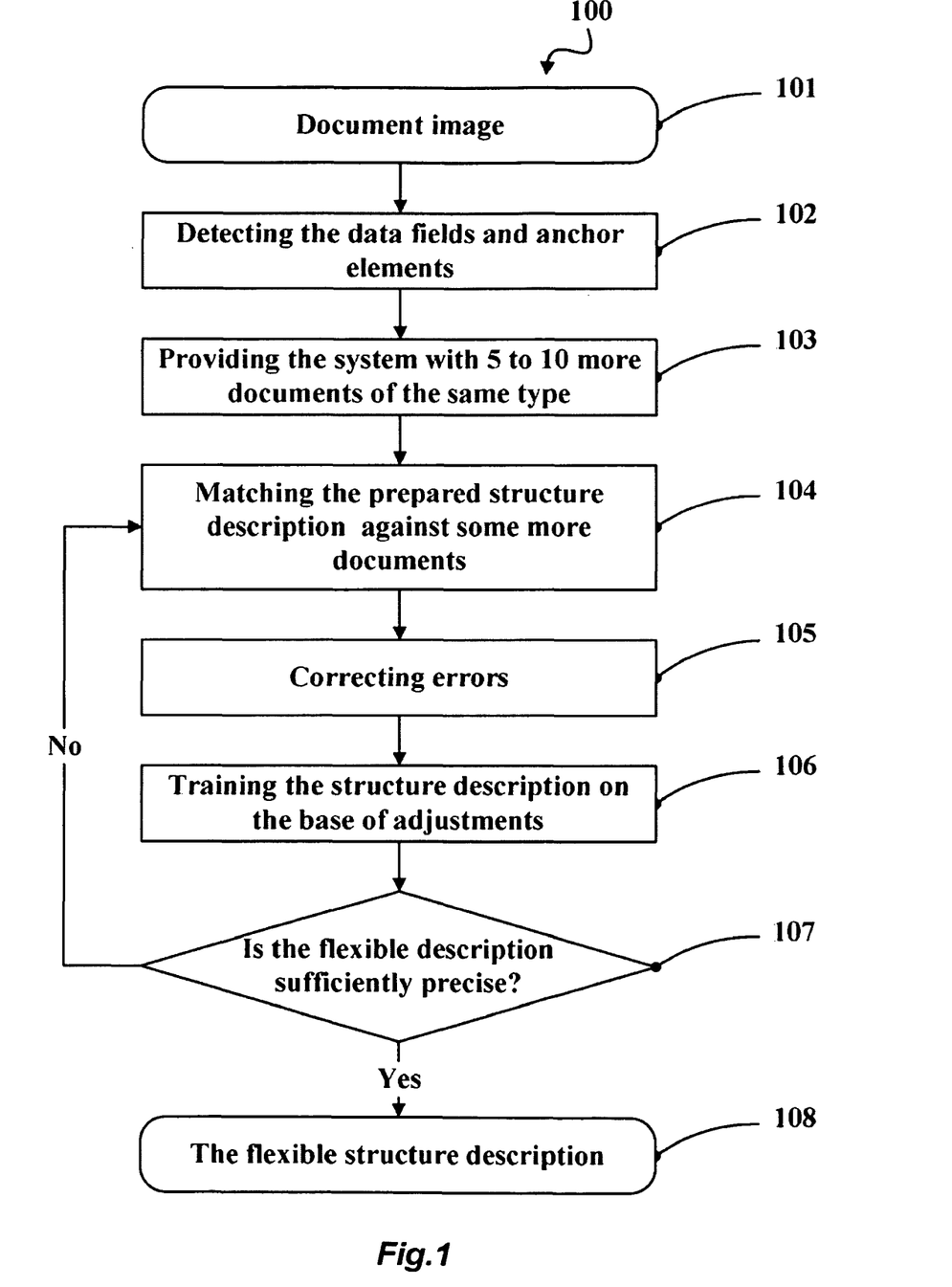
FIG. 1 shows a flowchart for creating a flexible structure description for a document, in accordance with one embodiment of the invention.

In one embodiment, the inventive method to create a flexible structure description includes the steps shown in FIG. 1. In the case of a new semi-structured document completely unknown to the system, which may contain one or more pages, the first step is to select on the entire document image (101) certain image objects of predefined types (separator line, bar code, check mark, picture, separate word, line of words, paragraph, etc.). To enable this selection step, in one embodiment, the system is provided with information about the data fields from which information has to be captured into a database and about the anchor elements (102) which help to detect the data fields. The information about the data fields may be user input. Each anchor element enables detection of a data field based its position relative to the anchor element, as will be described.

A field's region may enclose one or more previously selected image objects of check mark, bar code or text types. Once a field is specified, the system automatically recognizes the text objects or bar codes inside this field. Additionally, the system recognizes the lines in the vicinity of the field, which may contain the name of the field or additional information about the field. If the field contains text, the system automatically identifies a data type corresponding to this text based on predefined data types. In one embodiment, the predefined data types may include date, time, number, currency, phone number, a string of predefined characters, a regular expression, and a string of several fixed combinations.

The system automatically creates a new flexible structure description or "structure description" which corresponds to a certain document type given the detected fields. For each field, a set of search elements is created in the structure description. The search elements are to be used by a search algorithm to detect the field and include anchor elements and type elements. A type element is added to the set of search elements whose type corresponds to the type of the data field. The type element may be used to detect the field proper. Additionally, auxiliary anchor elements of various types are added to the set. The system establishes the location of the data field relative to one or more of these search elements.

If, in the vicinity of the data field, the system detects a string whose position and text content suggest that it may contain the name of the field or additional information about the field, the system adds to the set of elements an element of type Static Text, which specifies the search criteria for this text string. The hypothesis will be tested later when several more documents of this type are fed to the system. If this string is reliably detected in the vicinity of the same field on the majority of the other images, the hypothesis is deemed to be the right one. Besides, the hypothesis may be confirmed or refuted by an operator of the data capture system, and the Static Text element can be deleted from the set of elements describing the data field.

A semi-structured form may have no name for some or even all of its fields, in which case the fields are detected using other types of anchor elements.

In one embodiment, the system allows specifying an unlimited number of auxiliary anchor elements in each set of elements describing a field. The set of predefined element types includes: Static Text, Separator, White Gap, Barcode, Character String, Paragraph, Picture, Phone, Date, Time, Currency, Logo, Group, Table, Repeating Item, and others. The system may be provided with information about the position of auxiliary image objects, in which case the system will automatically create elements of the corresponding types and specify their search criteria.

An element's search criteria include the type of the image object to detect, its physical properties, its search area, and its spatial relationships with other, already described, elements. For example, to find an amount on an image of an invoice, the user may create an element of type Currency with the following properties: likely currency names ($, USD, EUR, EURO, RUB); likely decimal separators (, .); position of currency name relative to the amount (before the amount, after the amount), etc. An important feature of the method is the ability to specify the physical properties of elements of any type through allowed ranges of values. For example, the user may specify the minimum and maximum lengths and widths of a separator line, possible letter combinations in a keyword, possible alphabets for a character string, etc. Thus, for one and the same field or element, a broad range of alternatives can be specified, which reflects variation typical in semi-structured documents.

Additionally, element properties include parameters for handling possible image distortions which may occur when converting documents into electronic format (e.g. when scanning or photographing a document). For example, the user may allow for a certain percentage of OCR errors in keywords (elements of type Static Text), separator lines may have breaks of certain absolute or relative lengths, and white spaces (elements of type White Gap) may have a certain small amount of noise objects that may be introduced during scanning. These parameters are set by the system automatically and may be adjusted by the operator if required.

The search area of any element in the structure description may be created using any of the following methods or a combination thereof: by specifying absolute search constraints by means of a set of rectangles with specified coordinates; by specifying constraints relative to the edges of the image; and by specifying constraints relative to previously described elements. An example of absolute constraints using a set of rectangles with user-specified coordinates: search in rectangles [0 inch, 1.2 inch, 5 inch, 3 inch], [2 inch, 0.5 inch, 6 inch, 5.3 inch]. An example of search constraints relative to the edges of the image: search below ⅓ of the height of the image, to the right of the middle of the image. An example of search constraints relative to another element: search above the bottom border of RefElement1 starting at the level 5 dots below border (i.e. with an offset of 5 dots); search to the left of the center of the rectangle that encloses RefElement2 starting 1 cm to the left of the center (i.e. with an offset of 1 cm). When using a combination of methods to specify a search area, the resulting area is calculated as the intersection of all the areas specified by each method.

The system automatically generates search constraints for an element which are to be specified relative to some other elements. In order to generate relative search constraints automatically, the system consecutively examines several images of the same type and selects constraints under which the required "above," "below," "left of," and "right of" conditions and offsets are met on all of the images. Offset values are also selected automatically so that the search criteria can be met on all of the above. If the position of the anchor element relative to the field varies from document to document, the search constraint is specified as follows: e.g. "either above RefElement1 by 3 inches or below RefElement1 by 5 inches." Thus formulates, the condition specifies alternative search areas for one and the same element.

Absolute constraints on an element's search area and constraints relative to the image edges are not obligatory and are specified by the operator if there are no reliable anchor elements on the image. To be reliable, an anchor element must occur on the majority of documents of the given type.

An important feature of the method is the ability to use the search constraints that are based on the mutual positioning of elements even if some of these elements have not been detected on the image. The system may fail to detect an element either because the corresponding image object is physically absent on the image as a result of the document's semi-structured nature, or because the image was lost or distorted during scanning. If an element is not detected, the system uses its specified search area when establishing mutual spatial relationships among this non-detected element and other elements.

Thus, whenever a new kind of document is fed into the data capture system, it automatically generates a preliminary flexible document description which already contains a search algorithm to be used to detect all the data fields indicated by the user. Additionally, the system attempts to detect image objects (titles, logos) whose position and physical properties may potentially be used to distinguish this type of document from other types. For this purpose, the system examines the objects at the very top of the document, looking for text lines whose height is significantly greater than the average height of the body text characters and for text lines in bold fonts. Additionally, the system looks for picture objects at the very top of the image which may be logos. For each line and picture detected in this manner, the system creates an element of the corresponding type (Static Text or Logo).

The hypothesis that these type-identifying elements can be reliably detected on other documents of this type is tested during extra training when some more documents are fed to the system. If the identifying elements created by the system cannot be found on all documents, the system uses the complete set of elements in the structure description to identify the document's type.

To improve the structure description, the user feeds to the system 5 to 10 more documents (103) of the same type for additional training. The set of images used for training should, as much as possible, cover the entire range of variations of the forms to be processed.

The prepared structure description obtained at step 102 is matched by the system against some more documents (104), and any errors and mismatches are displayed to the operator. The operator then points out to the system those fields which have been detected incorrectly or not detected at all. The system adjusts the set of search constraints in the structure description so that they do not come into conflict with the fields (105) pointed out by the operator. At the same time, alternative search areas may be added for an element, offsets for "above," "below," "left of," and "right of" relationships may be adjusted, unreliable anchor elements may be removed, and new anchor elements may be added. Besides, several alternative search elements may be created for a field, which the system will search consecutively.

The adjustments are used for training the structure description (106). During extra training, the system assesses how reliably type-identifying elements are detected and makes changes to their make-up and search criteria. The adjusted structure description is matched both against problem pages (to make sure that the error has been corrected) and against the other pages (to make sure that the corrections have not affected the detection of elements elsewhere).

Steps 104 and 105 are repeated on some more documents until the flexible structure description is sufficiently precise to be used for automated analysis (107). In other words the search criteria allows detection of the associated search elements within a defined reliability threshold. Once the desired level of precision is achieved, the flexible structure description (108) is saved in the list of trained structure descriptions available to the data capture system.

Figure 2:
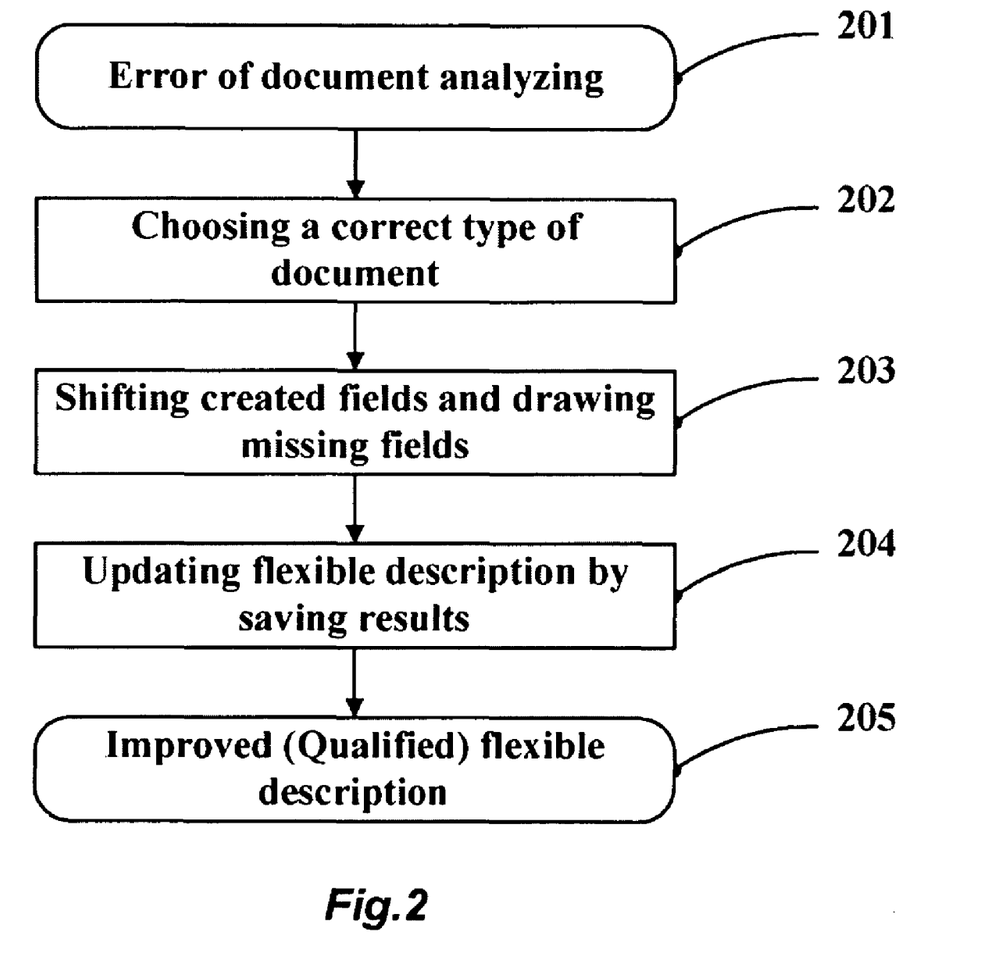
FIG. 2 shows a flowchart for adapting a flexible structure description to a new variation of the document, in accordance with one embodiment of the invention.

If additional requirements to a structure description created in the above manner arise, or if a previously unknown variation of an existing document type appears, additional adjustments to or training of the structure description may be needed. In this case, the steps shown in the flowchart in FIG. 2 are performed. Unlike the scenario 100, this scenario does not include the step of adjusting the make-up and properties of anchor elements, only constraints on the mutual positioning of elements and fields are adjusted. This approach speeds up the entire process.

If an analysis error (201) is returned when checking the OCR results, the user may correct the incorrectly selected type of document (202) and adjust the position of the regions of incorrectly detected fields (203). For this purpose, the created fields in the structure description are shifted and the lacking fields are drawn wherever required. This process is aided by prompts from the system. Next, when saving the changes, the corrections are taken into account and the structure description is adjusted (204). If required, the procedure may be repeated on the next problem document. Thus, by amassing the changes made by the operator, the system, obtains an increasingly more precise structure description (205) which is suitable for the correct processing of further documents.

Figure 3:
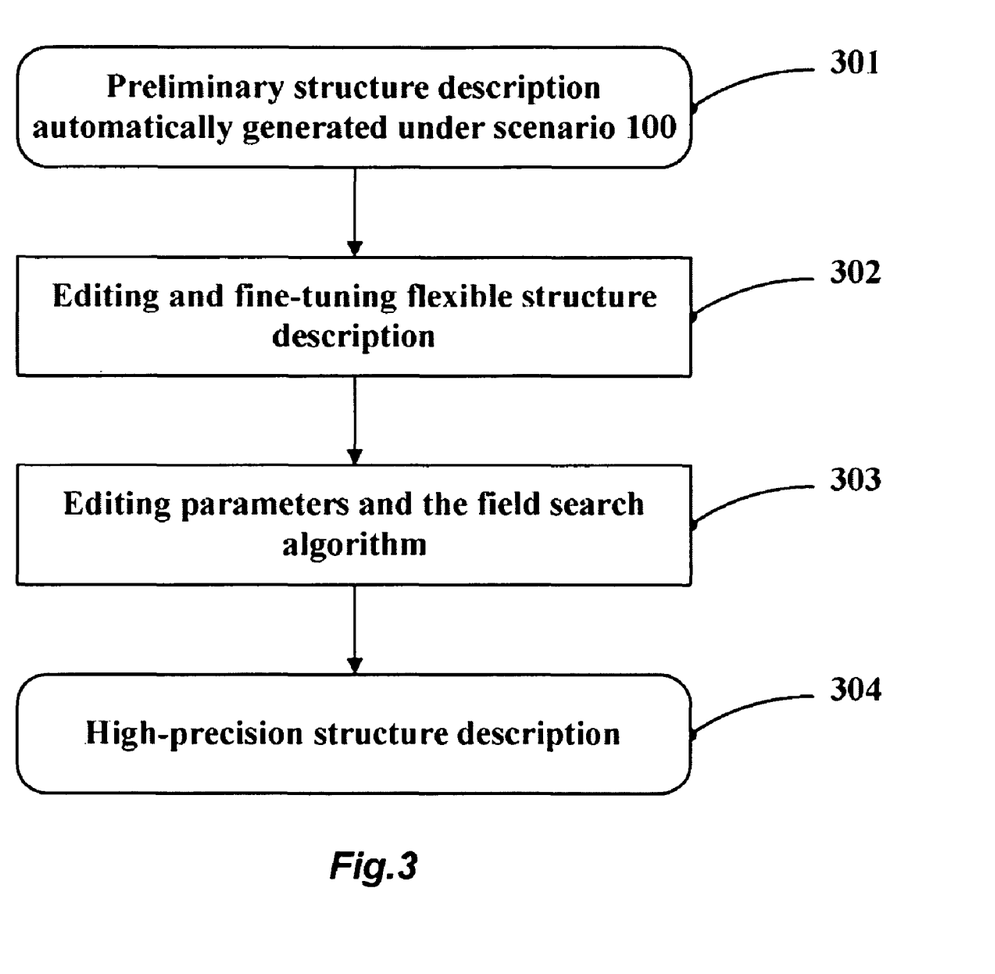
FIG. 3 shows a flowchart for simplified method for creating a flexible structure description, in accordance with one embodiment of the invention.

If documents with very complex structures are fed to the data capture system and an automatically generated structure description (scenario 100) does not produce desired results, the structure description for this type of document must be created by a human expert. The sequence of actions for this scenario is provided in FIG. 3. The preliminary structure description (301) automatically generated under scenario 100 is reworked by the human expert in a dedicated application for editing and fine-tuning flexible structure descriptions (302), which speeds up and simplifies the labor-intensive task of fine-tuning the field search algorithm (303). As a dedicated tool for editing flexible structure descriptions the operator may use, for example, the ABBYY FlexiCapture Studio software application. Generally, this scenario is used either for creating high-precision structure descriptions (304) of documents with complex formatting, with fields running from one page to the next, with multiple tables and repeating elements.

FIG. 4a shows a sample invoice (400). The anchor element Invoice No. (401) is used to detect the text field to the right (402), which contains the invoice number to be captured. Detection of table field names (403) can be used to extract data from the table. The anchor element Total CHF (404) is used to detect the amount (405), with the search area lying to the right of 404. Between the anchor element Payment (406) and the text paragraph 408 there is a sufficiently wide space to prevent misdetection. One more anchor element may be added (of type White Gap, 407) and the search area to the right of this element may specified for the paragraph (408). Often scanning will introduce unwanted noise (409), which may cause incorrect recognition of text (408). To prevent this type of error, the user may additionally limit the search area of element (408) on the right with yet another element of type White Gap.

FIG. 4b shows yet another sample invoice (420), which also fits the structure description of the sample invoice of FIG. 4a (400). The field 423 can be found using the anchor element Discount (421). This kind of element occurs several times on the page, and we can detect the right anchor element Discount (421) by limiting the search to the space between the separator lines (422).

Figure 4C:
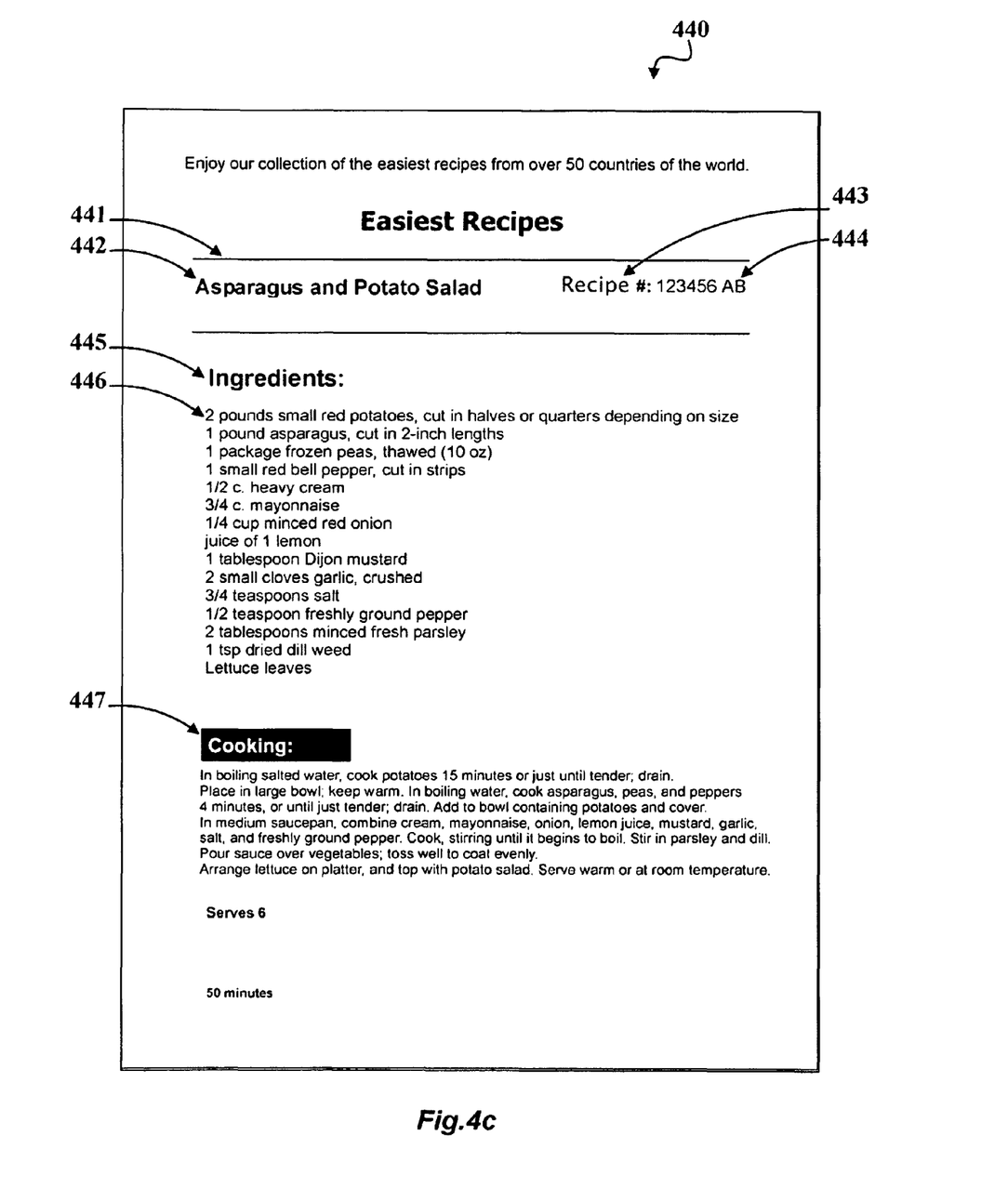
FIG. 4c shows a schematic view of a sample recipe.

FIG. 4c shows a sample recipe (440). The name of the dish 442 is the top most text fragment below the separator line. This search criterion will also find the number of the recipe (443, 444). To exclude the number, we may specify that the anchor element 443 and the number 444 itself should be detected prior to search 442, and then exclude 443 and 444 from the topmost text detected under 441. Ingredients can be detected as text paragraph 446 between anchors 445 and 447.

Figure 4D:
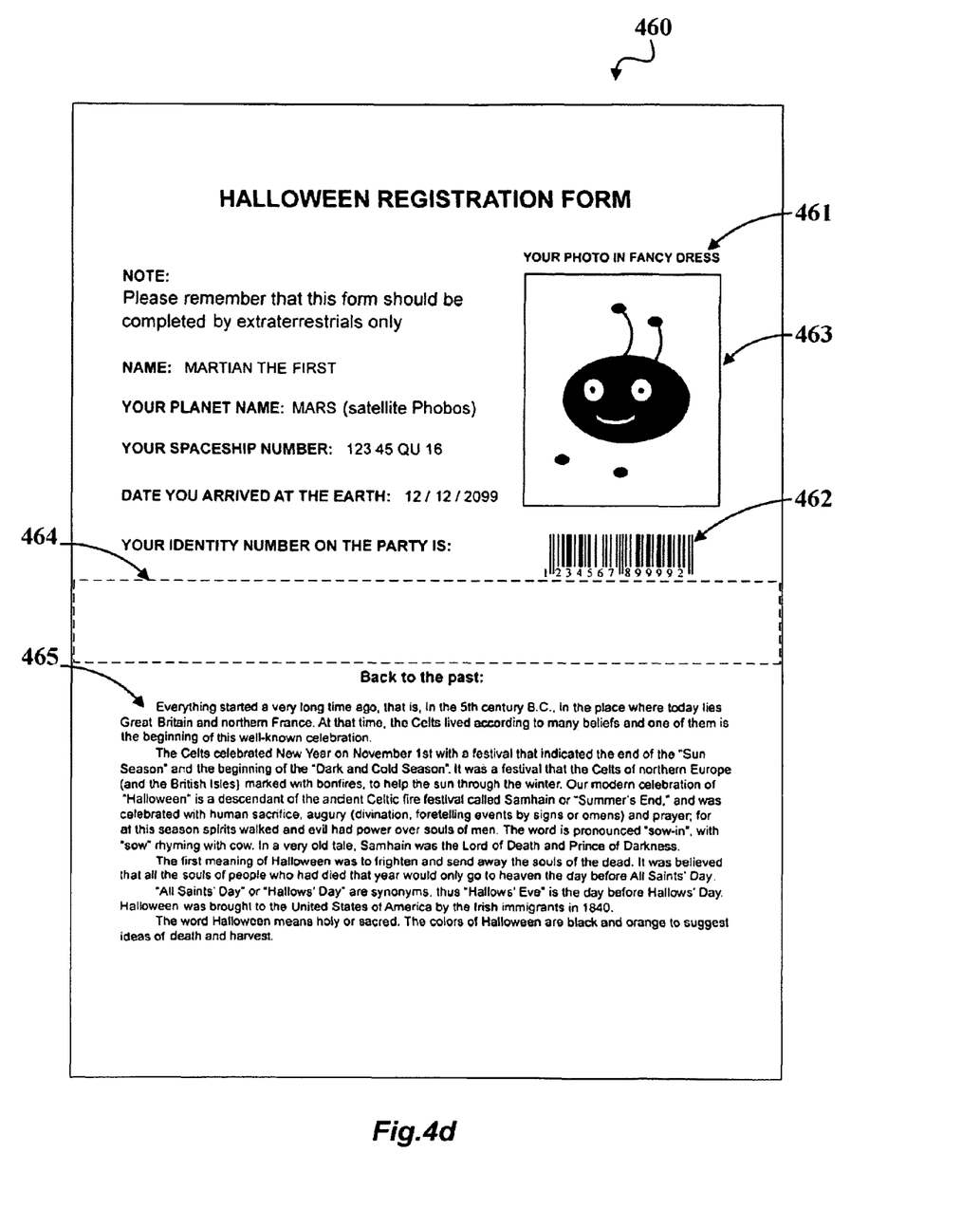
FIG. 4d shows a schematic view of a sample registration form.

FIG. 4d shows a sample registration form (460). The photo 463 can be detected using two different methods, either by searching for a picture enclosed by four separator lines or by searching for a picture below the text 461 and above the bar code 462. To detect the text paragraph 465, the best strategy is to look for the gap 464 below the barcode 462 and specify the space below 464 as the search area for 465.

Figure 5:
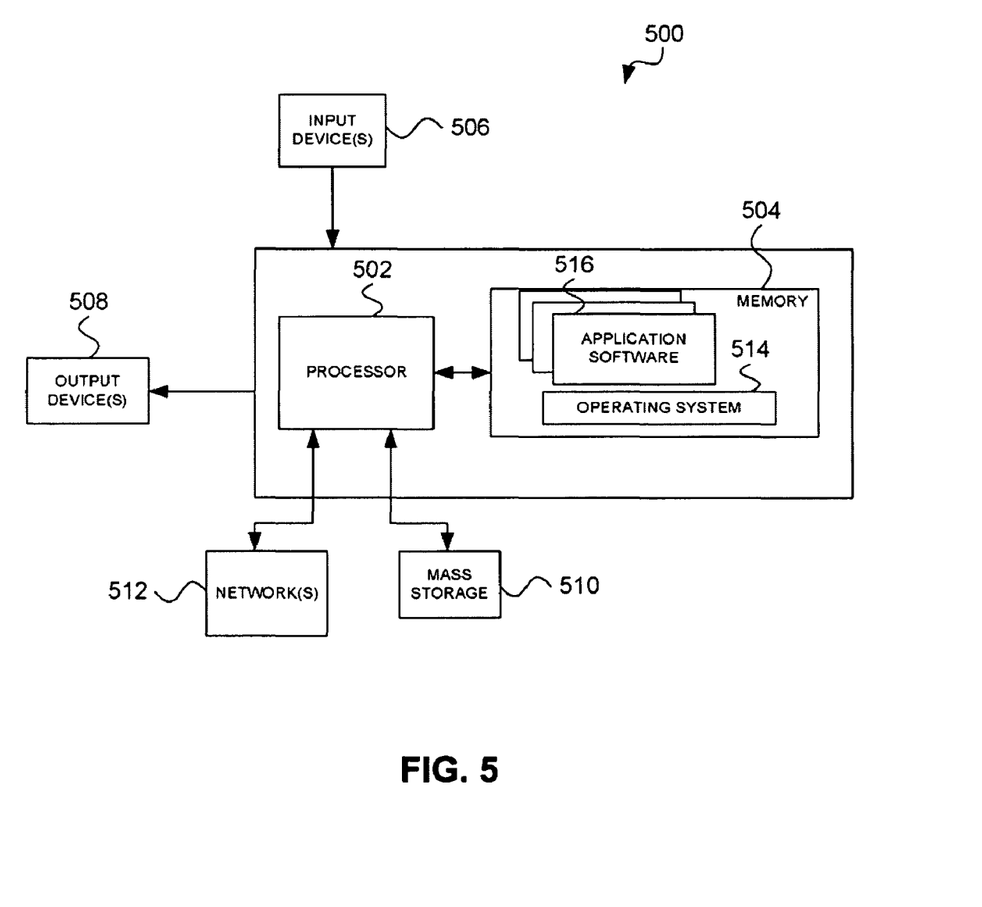
FIG. 5 shows a block diagram of exemplary hardware for implementing the techniques of the invention.

FIG. 5 of the drawings shows an example of a system 500 for implementing the techniques disclosed herein. The system 500 may include at least one processor 502 coupled to a memory 504. The processor 502 may represent one or more processors (e.g., microprocessors), and the memory 504 may represent random access memory (RAM) devices comprising a main storage of the system 500, as well as any supplemental levels of memory e.g., cache memories, non-volatile or back-up memories (e.g. programmable or flash memories), read-only memories, etc. In addition, the memory 504 may be considered to include memory storage physically located elsewhere in the system 500, e.g. any cache memory in the processor 502 as well as any storage capacity used as a virtual memory, e.g., as stored on a mass storage device 510.

The system 500 also typically receives a number of inputs and outputs for communicating information externally. For interface with a user or operator, the system 500 may include one or more user input devices 506 (e.g., a keyboard, a mouse, imaging device, etc.) and one or more output devices 508 (e.g., a Liquid Crystal Display (LCD) panel, a sound playback device (speaker, etc)).

For additional storage, the system 500 may also include one or more mass storage devices 510, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the system 500 may include an interface with one or more networks 512 (e.g., a local area network (LAN), a wide area network (WAN), a wireless network, and/or the Internet among others) to permit the communication of information with other computers coupled to the networks. It should be appreciated that the system 500 typically includes suitable analog and/or digital interfaces between the processor 502 and each of the components 504, 506, 508, and 512 as is well known in the art.

The system 500 operates under the control of an operating system 514, and executes various computer software applications, components, programs, objects, modules, etc. to implement the techniques described above. Moreover, various applications, components, programs, objects, etc., collectively indicated by reference 516 in FIG. 5, may also execute on one or more processors in another computer coupled to the system 500 via a network 512, e.g. in a distributed computing environment, whereby the processing required to implement the functions of a computer program may be allocated to multiple computers over a network. The application software 516 may include a set of instructions which, when executed by the processor 502, causes the system 500 to implement the techniques disclosed herein.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others.

Although the present invention has been described with reference to specific example embodiments, it will be evident that various modifications and changes can be made to these embodiments without departing from the broader spirit of the invention. Accordingly, the specification and drawings are to be regarded in an illustrative sense rather than in a restrictive sense.

The invention claimed is:

1. A computer-implemented method comprising:
obtaining an image of a paper document;
detecting data fields on the image corresponding to a document type;
generating by a processor of a data capture system a flexible document description for the document type based on the detected data fields, including creating a set of search elements for each data field, each search element having one or more associated search criteria; and
training the flexible document description using a search algorithm to detect the data fields on additional training images based on the set of search elements.

2. The method of claim 1, wherein training the flexible document description comprises:
assessing a reliability of the search criteria associated with a search element to detect a given data field on the additional images; and
selectively adjusting the one or more search criteria so that the one or more search criteria are used to detect the given data field on the additional images within a defined reliability threshold.

3. The method of claim 1, further comprising receiving a user input indicating at least one of the data fields to be detected.

4. The method of claim 1, wherein the search elements comprise a type element to identify a data field by type and at least one anchor element to enable detection of a data field based on its position relative to the anchor element.

5. The method of claim 1, wherein the search elements comprise a plurality of auxiliary anchor elements, each to describe a data field.

6. The method of claim 5, wherein the auxiliary anchor elements are predefined and are selected from the group consisting of Static Text, Separator, White Gap, Barcode, Character String, Paragraph, Picture, Phone, Date, Time, Currency, Logo, Group, Table, and Repeating Item.

7. The method of claim 1, wherein the one or more associated search criteria comprises a type of the image object to detect, its physical properties, its search area, and its spatial relationships with other elements.

8. The method of claim 7, wherein the one or more associated search criteria comprise a image distortion parameter to enable handling of a distortion in images during conversion into electronic format.

9. The method of claim 8, wherein the image distortion parameter is selected from the group consisting of an indication of a quantity of optical character recognition (OCR)

errors in elements of type Static Text; an indication of a length of breaks in separator lines; and an indication of an amount of noise objects in white spaces.

10. The method of claim 9, wherein the image distortion parameter is chosen automatically.

11. The method of claim 7, wherein the search area for an element is specified in terms of search constraints selected from the group consisting of an absolute search constraint specified in terms of a array of rectangles with specified coordinates; a relative search constraint specified relative to the edges of the image of the paper document; and a relative search constraint specified relative to other search elements.

12. The method of claim 11, wherein detecting the data fields comprises detecting image objects capable of distinguishing the document type from other document types.

13. The method of claim 12, wherein the image objects are selected from the group consisting of titles, and logos.

14. A non-transitory computer-readable medium having stored thereon a sequence of instructions which when executed by a system, causes the system to perform a method, comprising:
  detecting data fields on an image;
  generating a flexible document description based on the detected data fields, including creating a set of search elements for each data field, each search element having one or more associated search criteria; and
  training the flexible document description using a search algorithm to detect the data fields on additional training images based on the set of search elements.

15. The non-transitory computer-readable medium of claim 14, wherein training the flexible document description comprises assessing a reliability of the one or more associated search criteria associated with a search element to detect a given data field on the additional images and selectively adjusting the one or more associated search criteria so that the one or more associated search criteria can be used to detect the given data field on the additional images within a defined reliability threshold.

16. The non-transitory computer-readable medium of claim 14, wherein the method further comprises receiving a user input indicating one or more of the data fields to be detected.

17. The non-transitory computer-readable medium of claim 14, wherein the search elements comprise a type element to identify a data field by type and at least one anchor element to enable detection of a data field based on its position relative to the anchor element.

18. The non-transitory computer-readable medium of claim 14, wherein the search elements comprise a plurality of auxiliary anchor elements, each to describe a data field.

19. The non-transitory computer-readable medium of claim 18, wherein the auxiliary anchor elements are predefined and are selected from the group consisting of Static Text, Separator, White Gap, Barcode, Character String, Paragraph, Picture, Phone, Date, Time, Currency, Logo, Group, Table, and Repeating Item.

20. A system comprising:
  a processor; and
  a memory coupled to the processor, the memory storing instructions which when executed by the processor causes the system to perform a method, comprising:
  detecting data fields on an image;
  generating a flexible document description based on the detected data fields, including creating a set of search elements for each data field, each search element having one or more associated search criteria; and
  training the flexible document description using a search algorithm to detect the data fields on additional training images based on the set of search elements.

21. The system of claim 20, wherein training the flexible document description comprises assessing a reliability of the one or more search criteria associated with a search element to detect a given data field on the additional images and selectively adjusting the one or more of the one or more associated search criteria so that the one or more associated search criteria can be used to detect the given data field on the additional images within a defined reliability threshold.

22. The system of claim 20, wherein the method further comprises receiving a user input indicating one or more of the data fields to be detected.

* * * * *